United States Patent
Pierce et al.

(10) Patent No.: US 10,252,740 B2
(45) Date of Patent: Apr. 9, 2019

(54) SKI BIKE SYSTEMS AND DEVICES

(71) Applicant: TNGNT Ski Bikes, Inc., Bluffdale, UT (US)

(72) Inventors: Charles W. Pierce, Folsom, CA (US); Scott Carr, Bluffdale, UT (US)

(73) Assignee: TNGNT SKI BIKES, INC., Bluffdale, UT (US)

( * ) Notice: Subject to any disclaimer, the term of this patent is extended or adjusted under 35 U.S.C. 154(b) by 0 days.

(21) Appl. No.: 15/715,141

(22) Filed: Sep. 25, 2017

(65) Prior Publication Data
US 2018/0086360 A1 Mar. 29, 2018

Related U.S. Application Data

(60) Provisional application No. 62/400,489, filed on Sep. 27, 2016.

(51) Int. Cl.
*B62B 13/04* (2006.01)

(52) U.S. Cl.
CPC .................. *B62B 13/046* (2013.01)

(58) Field of Classification Search
CPC ........ B62B 13/02; B62B 13/04; B62B 13/046
See application file for complete search history.

(56) References Cited

U.S. PATENT DOCUMENTS

| | | | | |
|---|---|---|---|---|
| 3,178,196 A * | 4/1965 | Colace | ................ | B62B 13/04 280/16 |
| 3,561,783 A * | 2/1971 | Ellett | ................ | B62B 13/04 280/16 |
| 3,638,960 A * | 2/1972 | Eaton | ................ | B62B 13/16 280/16 |
| 3,717,359 A * | 2/1973 | Peronnon | ................ | B62B 13/04 280/16 |
| 4,097,055 A * | 6/1978 | Laycraft | ................ | B62B 13/04 280/16 |
| 6,783,134 B2 * | 8/2004 | Geary | ................ | A63C 5/031 280/16 |
| 8,177,241 B1 * | 5/2012 | Marks | ................ | B62B 13/046 280/14.28 |
| 2002/0060436 A1 * | 5/2002 | Spiers | ................ | B62B 13/04 280/14.28 |
| 2003/0067127 A1 * | 4/2003 | McClure | ................ | B62B 13/04 280/14.28 |
| 2009/0033047 A1 * | 2/2009 | Paganoni | ................ | B62B 13/04 280/14.28 |
| 2009/0140503 A1 * | 6/2009 | Kolesar | ................ | B61B 11/008 280/16 |
| 2009/0230641 A1 * | 9/2009 | Eugenio | ................ | B62B 13/04 280/16 |
| 2010/0109267 A1 * | 5/2010 | Leycraft | ................ | B62B 13/04 280/21.1 |

(Continued)

*Primary Examiner* — Erez Gurari
(74) *Attorney, Agent, or Firm* — Maschoff Brennan; Paul G. Johnson

(57) ABSTRACT

In some examples, a ski bike includes a frame, a steering mechanism rotatably coupled to the frame, a ski, and a ski retention system. The ski retention system rotatably couples the ski to the frame or the steering mechanism. The ski retention system includes a ski bracket and a fixed member. The ski bracket is rigidly coupled to the ski. The fixed member is rigidly coupled to the frame or the steering mechanism and rotatably coupled to the ski bracket.

19 Claims, 14 Drawing Sheets

(56) References Cited

U.S. PATENT DOCUMENTS

2015/0183452 A1* 7/2015 Kasparian ............... B62B 17/08
                                                          280/16
2016/0236701 A1* 8/2016 Corning ................ B62B 13/046
2018/0086360 A1* 3/2018 Pierce .................. B62B 13/046

* cited by examiner

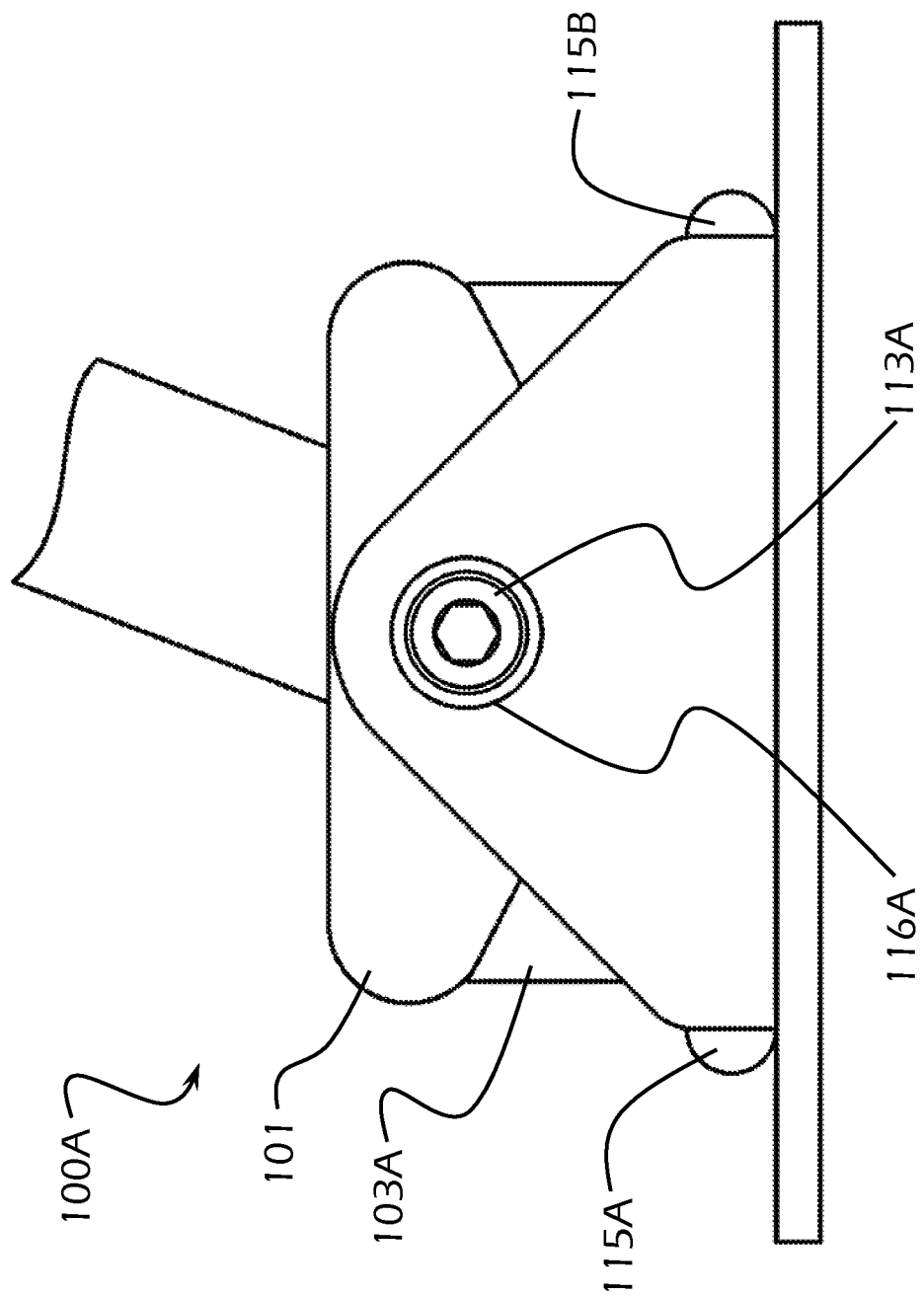

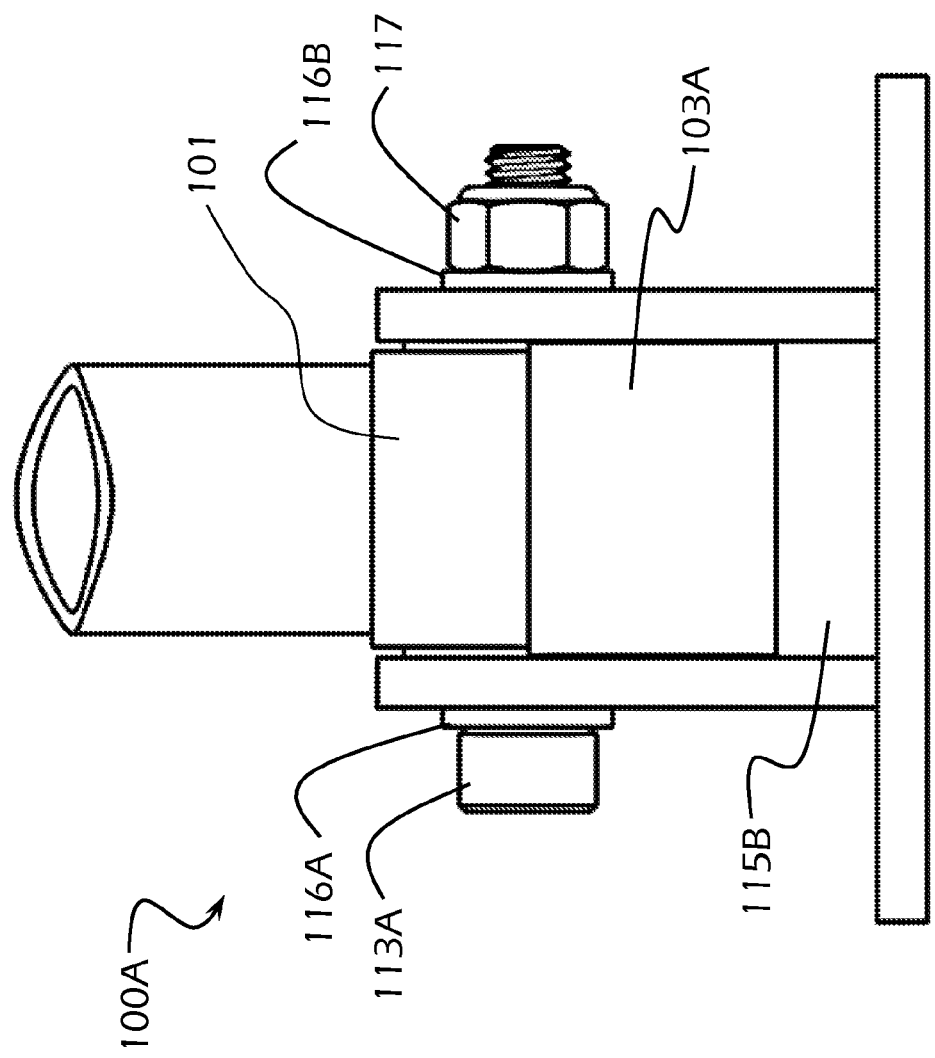

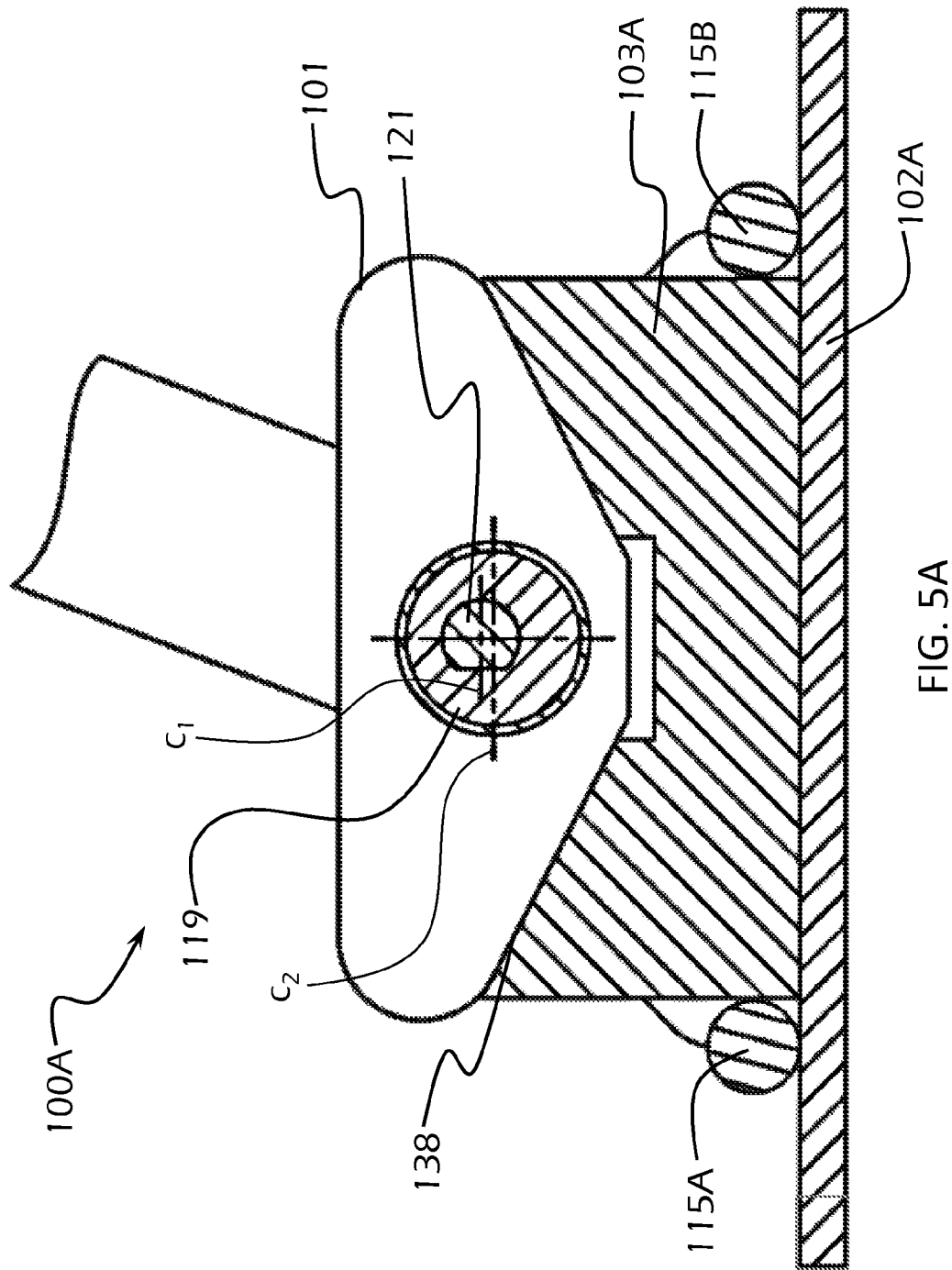

SKI BIKE SYSTEMS AND DEVICES

CROSS-REFERENCE TO RELATED APPLICATION

This application claims the benefit of and priority to U.S. Provisional App. No. 62/400,489, filed Sep. 27, 2016, which is incorporated herein by reference in its entirety.

FIELD

Embodiments disclosed herein generally relate to ski bike systems and devices, such as ski bike handling systems, suspension systems and/or foot placement apparatus.

BACKGROUND

Unless otherwise indicated herein, the materials described herein are not prior art to the claims in the present application and are not admitted to be prior art by inclusion in this section.

A ski bike is a recreational device, typically used at lift-served ski areas. As the name implies, it moves along the snow using skis and has the general form of a bicycle.

Ski bikes have been around for over a century. During that time, two primary designs have emerged to suit different riding styles. The first design utilizes a ski bike that is straddled by the rider, with the rider augmenting control of the ski bike with short foot skis. This style is typically referred to as the "skibob" style. The second design utilizes a ski bike where only the two skis of the bike are in contact with the snow; foot skis are not used. This style is typically referred to as the "pegger" style since the location where the rider's feet rest can be referred to as pegs. Both skibob style ski bikes and pegger style ski bikes have a loyal following, and both can provide recreational enjoyment with the proper design.

Skibob style ski bikes have gained a loyal following since the 1950's. Skibob style ski bikes have gained worldwide acceptance, especially in Europe where they were initially developed. At various times, skibob style ski bikes have even enjoyed enough popularity to prompt world championship races. Skibob style ski bikes are characterized as very rideable on groomed ski slopes. Groomed slopes provide the terrain where skibob style ski bikes can be ridden both fast and with good control.

Pegger style ski bikes have more recently gained popularity. Their popularity is driven by a desire to more closely replicate the experience found in modern mountain bicycles while on the snow. Pegger style ski bikes are truly ridden, with no part of the rider in contact with the ground. Since the bike isn't being straddled with the rider's feet in contact with the ground, pegger style ski bikes allow the rider to enjoy more extreme terrain than skibob style ski bikes.

The subject matter claimed herein is not limited to embodiments that solve any disadvantages or that operate only in environments such as those described above. Rather, this background is only to provide to illustrate one example technology where some embodiments described herein may be practiced.

SUMMARY

Embodiments described herein generally relate to ski bike systems and devices.

In an example embodiment, a ski retention system is connected to a bicycle steering mechanism or similar interface. The ski retention system includes a fixed member, which in this embodiment is rigidly attached directly to the bicycle steering mechanism or indirectly through an adapter, a bracket (hereafter "ski bracket") attached to a snow ski that is rotatably attached to the fixed member, and a resistance damper that may provide rotational resistance and modulation of the snow ski and ski bracket relative to the fixed member. An axis of rotation of the ski relative to the steering mechanism may be near the ski, such as less than four inches above a bottom surface of the ski. An axle that couples the fixed member and the ski bracket together may include bushings and a spacer with an offset D-shaped through-hole that acts as a cam when rotated. A D-shaped screw may be placed through the D-shaped hole in the spacer cam device, and when the screw is rotated the cam may provide an offsetting motion that may be used to tighten the fixed member into the resistance damper and ski bracket. This tightening action may provide a preload (or compression) of the resistance damper between the fixed member and the ski bracket that may allow the ski to rotate and move over undulations in the snow while providing resistance for riding and turning the ski bike.

In another example embodiment, a ski bike ski retention system is connected to a bicycle steering mechanism or similar interface. The retention system includes a fixed member, which in this embodiment is rigidly attached to the bicycle steering mechanism, a ski bracket attached to the snow ski that is rotatably attached to the fixed member, and a resistance damper that may provide rotational resistance and modulation of the snow ski and ski bracket relative to the fixed member. An axis of rotation of the ski relative to the ski bike may be near the ski. An axle that couples the fixed member and the bracket may include bushings and a spacer. The ski bracket may include an oversize hole with a nut with offset hole placed in the oversized hole that acts as a cam when rotated, hereafter referred to as a cam nut. A screw may be placed through the bracket, cam nuts, and spacer. When the cam nut is rotated, the screw may push on the axle spacer and provide an offsetting motion that may be used to tighten the fixed member into the resistance damper and bracket. This tightening action may provide a preload of the resistance damper between the fixed member and the ski bracket that may allow the ski to rotate and move over undulations in the snow while providing resistance for riding and turning the ski bike.

In another example embodiment, a ski bike ski retention system includes a fixed member with an axle interface integral to the ski bike. A ski bracket attached to the snow ski is rotatably attached to the fixed member. Between the ski bracket and fixed member is a resistance damper that provides rotational resistance and modulation of the snow ski and ski bracket relative to the fixed member. An axis of rotation of the ski relative to the ski bike may be near the ski. An axle that couples the fixed member and the ski bracket may include bushings and a spacer with an offset D-shaped through-hole that may act as a cam when rotated. A D-shaped screw may be placed through the D-shaped hole in the spacer cam device, and when the screw is rotated the cam may provide an offsetting motion that may be used to tighten the fixed member into the resistance damper and ski bracket. This tightening action may provide a preload of the resistance damper between the fixed member and the ski bracket that may allow the ski to rotate and move over undulations in the snow while providing resistance for riding and turning the ski bike.

In another example embodiment, a ski bike ski retention system includes a fixed member with an axle interface integral to the ski bike. A ski bracket attached to the snow ski is rotatably attached to the fixed member. Between the ski bracket and fixed member is a resistance damper that may provide rotational resistance and modulation of the snow ski and ski bracket relative to the fixed member. An axis of rotation of the ski relative to the ski bike may be near the ski. The resistance damper may alternatively or additionally include or be referred to as an elastomeric bumper that resists rotation. An axle that couples the fixed member and the bracket together may include bushings and a spacer. The ski bracket may include an oversize hole with a nut with offset hole placed in the oversized hole that acts as a cam when rotated, hereafter referred to as a cam nut. A standard screw may be placed through the bracket, cam nut, and spacer. When the cam nut is rotated, the screw may push on the axle spacer and provide an offsetting motion that is used to tighten the fixed member into the resistance damper and bracket. This tightening action may provide a preload of the resistance damper between the fixed member and the ski bracket that may allow the ski to rotate and move over undulations in the snow while providing resistance for riding and turning the ski bike.

In some example embodiments of a ski bike, the ski bike is a full suspension design. The suspension design is configured such that a shock used in a rear of the ski bike is protected from potential damaging impacts by a rear triangle of the ski bike.

In some example embodiments of a ski bike, the ski bike is configured to accept pedals or other platforms which the rider places their feet upon. This and other embodiments may include a standard bicycle bottom bracket with two bearing members that thread into a tube, e.g., the bottom bracket, in the ski bike frame. The bearing members may be threaded with standard bicycle bottom bracket threads. Within the bearing members is a tube that interfaces with pedals or other platforms on which feet are placed. Also in the tube there may be a hole in which may be placed a pin. The pin may interface with the right or left bearing member to prevent rotation of the entire assembly once tight.

In another example embodiment, a ski bike includes a frame, a steering member rotatably coupled to the frame, a ski, and a ski retention system that rotatably couples the ski to the frame or the steering mechanism. The ski retention system includes a ski bracket and a fixed member. The ski bracket is rigidly coupled to the ski. The fixed member is rigidly coupled to the frame or the steering mechanism and is rotatably coupled to the ski bracket.

In another example embodiment, a ski bike includes a front triangle, a steering mechanism rotatably coupled to the front triangle, a rear triangle or swing arm rotatably coupled to the front triangle, a ski coupled to the rear triangle or the swing arm, and a rear shock. The rear shock may have a first end coupled to the front triangle and a second end coupled to the rear triangle or the swing arm. The rear shock may be disposed within an envelope defined by the rear triangle or the swing arm.

In another example embodiment, a foot peg or pedal assembly may be configured to be coupled to a bottom bracket interface of a ski bike. The foot peg or pedal assembly may include a first cup, a second cup, and a pedal tube. The first cup may be configured to be coupled to a first side of the bottom bracket interface. The second cup may be configured to be coupled to a second side of the bottom bracket interface opposite the first side. The pedal tube may be configured to be disposed in the bottom bracket interface with a first end that extends out through the first cup and a second end that extends out through the second cup. The first cup may include a slot to receive a protrusion that extends outward from the pedal tube or the pedal tube may include a slot to receive a protrusion that extends inward from the first cup. The protrusion when received in the slot may be configured to fix the pedal tube with respect to the bottom bracket interface to prevent rotation of the pedal tube relative to the bottom bracket interface during installation and removal of pegs or pedals in the first and second ends of the pedal tube.

This summary is provided to introduce a selection of concepts in a simplified form that are further described below in the Detailed Description. This Summary is not intended to identify key features or essential characteristics of the claimed subject matter, nor is it intended to be used as an aid in determining the scope of the subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 3A-3E respectively show a perspective view, a top view, a side view, a front view and a back view of a lower portion of one of the ski retention systems of FIG. 1;

FIG. 5A shows a cross-sectional view of the ski retention system of FIG. 3B along a cutting plane 5A-5A of FIG. 3B arranged in a "tight" or "closed" position;

DETAILED DESCRIPTION OF SOME EXAMPLE EMBODIMENTS

Figure 1:
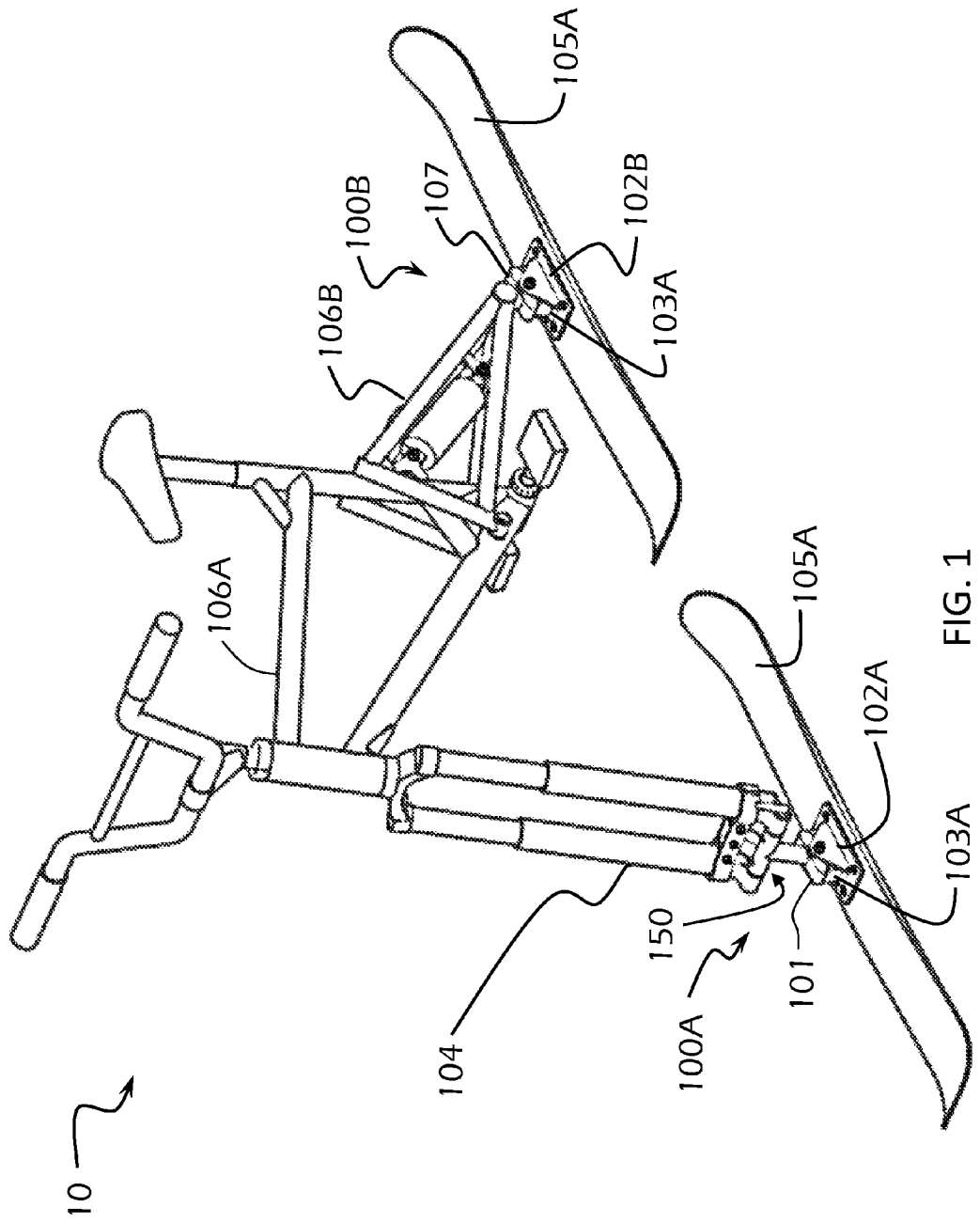
FIG. 1 shows a perspective view of a ski bike with two example ski retention systems.

Various aspects of both types of ski bikes (skibobs and peggers), when present, may contribute to making ski biking a safe and/or enjoyable recreational activity. First, the ski bike may be loadable on a ski lift for transport to the top of a mountain. If the ski bike is overly bulky or doesn't contain provisions for transportation on the lift, it may be difficult or impossible to transport on the lift. Another aspect that may contribute to enjoyment of a ski bike is how comfortable it is. Safety is another aspect. The ski bike must be able to be retained in the case that the rider is separated from the ski bike. All of these aspects, when properly combined, make ski bikes safe and enjoyable.

Another aspect is that the ski bike must handle effectively. The ski bike must glide over the snow, allow for turning, and must provide adequate ability for the ski to move over the undulations of the snow. Several variables go into a proper handling ski bike including:

ski position relative to a center of gravity of the ski bike and rider combination;

where the ski rotates relative to the bike, and the ski's resistance to rotation.

This combination of variables may be controlled and/or determined by the combination and arrangement of components used to couple the ski to the ski bike. The combination and arrangement of components used to couple the ski to the ski bike may be referred to herein as the "ski retention system" of the ski bike.

Both types of ski bikes require an adequate ski retention system. Skibob style ski retention systems have evolved based on the unique requirements of the skibob style ride. In a skibob, handling is influenced by both the forces of the rider transmitted through the ski bike into the skis, as well as the forces of the rider transmitted through the rider's foot skis. Since the skibob rider has the ability to remove their weight entirely from the skibob, even if only momentarily, much of the handling sensitivity of the bike itself can be compensated for by the rider.

This is not the case with a pegger style ski bike. In a pegger style ski bike, all of the force of the rider is transmitted through the bike frame, through the ski retention system and finally through the skis. Since all the forces of the rider are transmitted through the ski retention system in a pegger style bike, the overall ability to ride a pegger style ski bike is more dependent on the ski retention system than is the case for skibob style ski bikes. Design of the ski retention system is a variable in pegger style ski bike performance that can significantly influence handling of pegger style ski bikes.

Ski bike prior art, generally, does not appear to disclose detailed designs of ski retention systems, either for skibob or pegger style ski bikes.

In order to provide comfort for the rider and a greater ability to ride a variety of terrain, many modern ski bikes use a full suspension frame design. With a full suspension design, shock absorbers are used in the front and rear of the bike to provide the rider, through the ski bike, the ability to absorb bumps.

Accordingly, some embodiments disclosed herein include a ski bike ski retention system configured to connect a ski bike frame or bicycle steering mechanism to a snow ski. In some embodiments, the ski retention system may include:

a fixed member, which may be rigidly attached to another part of the ski bike, such as the steering mechanism, or may be integral to the ski bike frame;

a ski bracket attached to the snow ski that is rotatably attached to the fixed member; and a resistance damper between the ski bracket and fixed member that provides rotational resistance and modulation of the snow ski and ski bracket relative to the fixed member.

An axle that couples the fixed member and the ski bracket together may include bushings and a spacer with an offset D-shaped through-hole that acts as a cam when rotated. A D-shaped screw is placed through the D-shaped hole in the spacer, and when the D-shaped screw is rotated the spacer provides an offsetting motion that is used to tighten the fixed member into the resistance damper and ski bracket. This tightening action provides a preload of the resistance damper between the fixed member and the ski bracket that allows the snow ski to rotate and move over undulations in the snow while providing resistance for riding and turning the ski bike.

Reference will now be made to the drawing to describe various aspects of some example embodiments of the invention. It is to be understood that the drawings are diagrammatic and schematic representations of such exemplary embodiments, and are not limiting of the present invention, nor are they necessarily drawn to scale.

FIG. 1 shows a ski bike 10 with two example ski retention systems 100A and 100B, arranged in accordance with at least one embodiment described herein. The ski retention system 100A connects a steering mechanism 104 to a front ski 105A using a fixed member 101, a ski bracket 102A, and an adapter 150. The steering mechanism 104 of FIG. 1 and other figures is depicted as a suspension style fork. More generally, the steering mechanism 104 may include a fork with or without suspension, a single-sided "fork" with or without suspension, or other suitable steering mechanism. The fixed member 101 may integrally formed with the adapter 150 and/or the fixed member 101 may be separately formed from the adapter 150 and subsequently coupled to the adapter 150 using one or more nuts, bolts, other fasteners, adhesive, or other suitable coupler(s).

Between the fixed member 101 and the ski bracket 102A, the ski retention system 100A additionally includes a resistance damper 103A. The steering mechanism 104 is connected to a ski bike frame front triangle 106A (hereinafter "front triangle 106A") which is connected to a ski bike frame rear triangle 106B (hereinafter "rear triangle 106B") or swing arm. In other embodiments, the front triangle 106A and the rear triangle 106B may be a single integral unit.

The ski retention system 100B includes a fixed member 107 that is integral to the rear triangle 106B and/or coupled directly to the rear triangle 106B without use of an adapter. The ski retention system 100B connects the rear triangle 106B to a rear ski 105B using the fixed member 107 and a ski bracket 102B. Between the fixed member 107 and the ski bracket 102B, the ski retention system 100B additionally includes a resistance damper 103B.

In the ski retention system 100A, the combination of the adapter 150, the fixed member 101, the ski bracket 102A, and the resistance damper 103A may provide a primary structure that allows the front ski 105A to rotate and move over undulations in the snow while providing resistance for riding and turning the ski bike 10. Analogously, in the ski retention system 100B, the combination of the fixed member 107, the ski bracket 102B, and the resistance damper 103B may provide a primary structure that allows the rear ski 105B to rotate and move over undulations in the snow while providing resistance for riding and turning the ski bike 10.

As will be described in more detail below, the fixed member 101 may be rigidly clamped to the steering mechanism 104 with the adapter 150. The fixed member 107 may be integral to and/or directly coupled to the rear triangle 106B and may thereby be rigidly fixed with respect to the rear triangle 106B. More generally, any arrangement that holds the fixed member 101 or 107 rigid with respect to the front or rear of the ski bike 10 may be implemented.

The ski bike 10 illustrated in FIG. 1 is implemented as a pegger style ski bike. Generally, however, any style of ski bike, whether pegger style, skibob style, or other style, may be implemented with one or more of the various aspects illustrated in FIGS. 1-8. Further, the various aspects of the ski bike 10 may be implemented alone, all in combination, or in subcombinations.

Figure 2A:
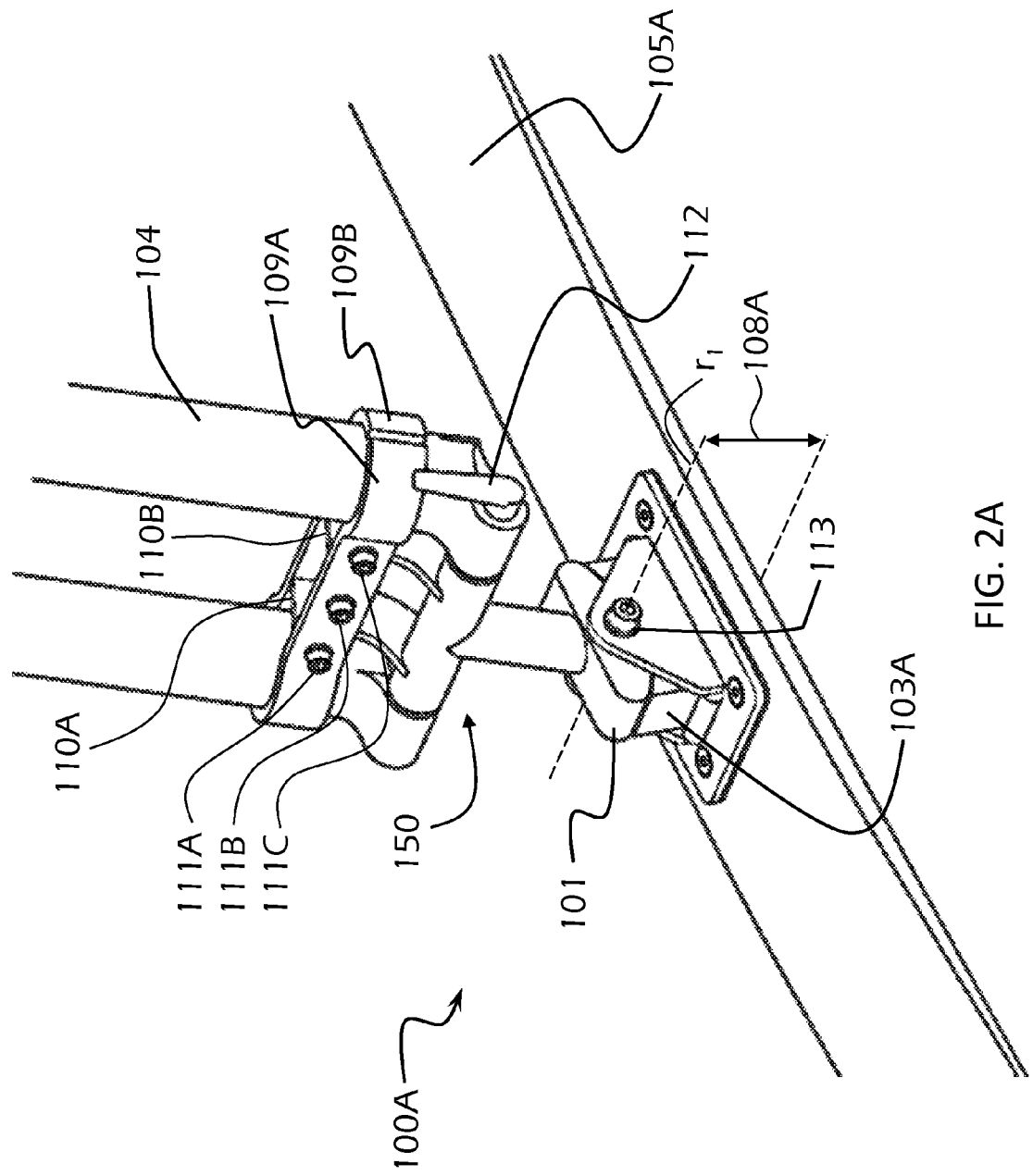
FIGS. 2A and 2B show perspective detailed views of the two ski retention systems of FIG. 1.
Figure 2B:
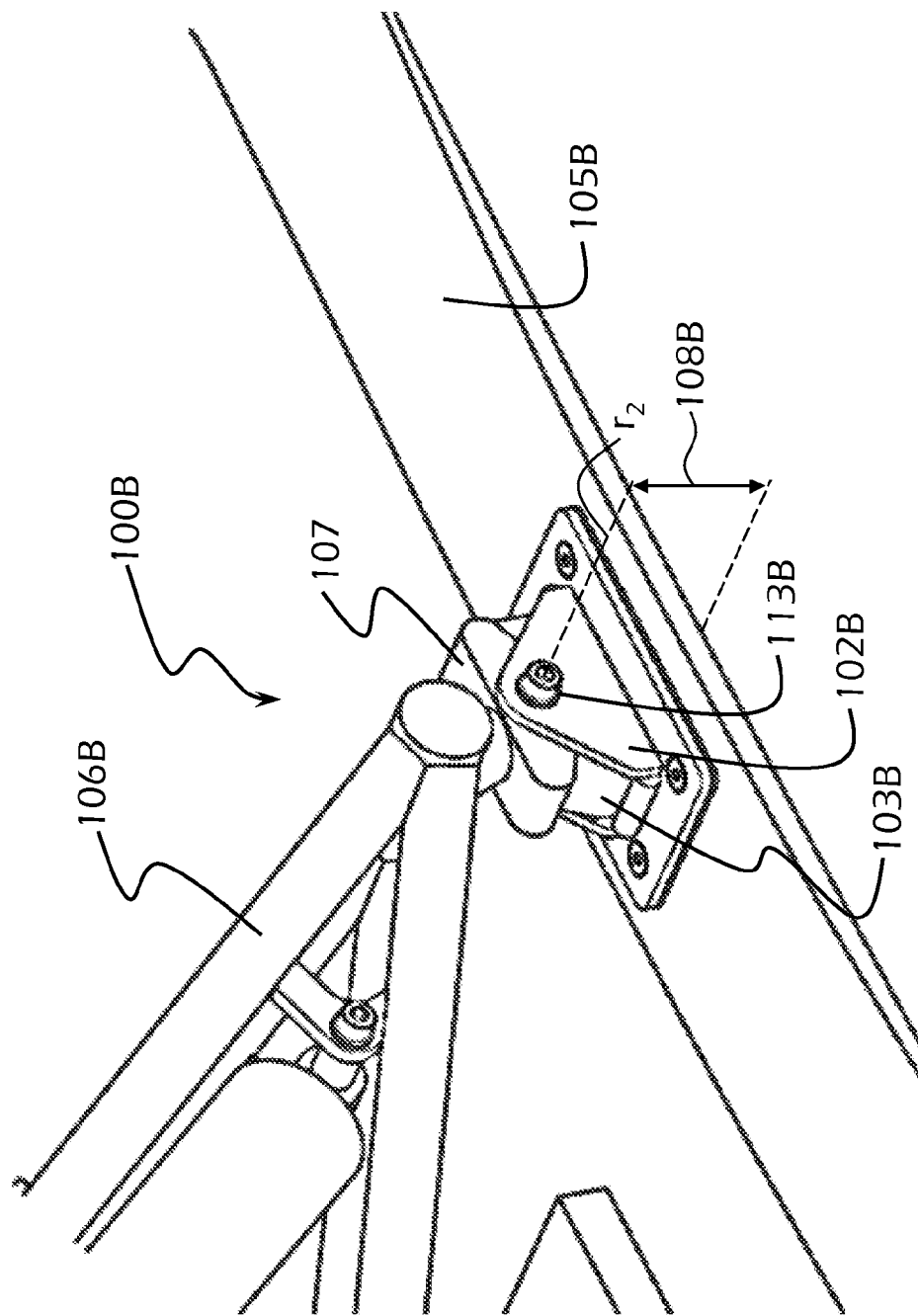

FIGS. 2A and 2B show perspective detailed views of, respectively, the ski retention system 100A and the ski retention system 100B of FIG. 1, arranged in accordance with at least one embodiment described herein. The ski retention system 100A of FIG. 2A may include a rotational axis $r_1$ about which the ski bracket 102A and the front ski 105A may rotate relative to the fixed member 101 and more generally the rest of the ski bike 10. The ski retention system 100B of FIG. 2B may include a rotational axis $r_2$ about which the ski bracket 102B and the rear ski 105B may rotate relative to the fixed member 107 and more generally the rest of the ski bike 10.

In each of the ski retention systems 100A and 100B, the corresponding rotational axis $r_1$ or $r_2$ between the fixed member 101 or 107 and the ski bracket 102A or 102B may be a corresponding height 108A (FIG. 2A) or 108B (FIG. 2B) above a plane where the front or rear ski 105A or 105B contacts ground or snow. Each of the heights 108A and 108B may be any value in a range from zero inches to four inches, or in a range from 0.5 inches to four inches, or in a range from one inch to four inches. The range of one to four inches for each of the heights 108A and 108B may provide a good tradeoff between providing adequate space to design and package the corresponding joint and limited height to prevent a pendulum type effect of the front or rear ski 105A or 105B about the corresponding rotational axis $r_1$ or $r_2$. In some embodiments, the height 108A of the ski retention system 100A and the height 108B of the ski retention 108B system are equal. In other embodiments, the height 108A of the ski retention system 100A may have a first value in the range of zero to four inches while the height 108B of the ski retention system 100B may have a different second value in the range of zero to four inches.

In the ski retention system 100A of FIG. 2A, the fixed member 101 is rigidly clamped to the steering mechanism 104 using the adapter 150 that includes two connecting members 109A and 109B that clamp around the steering mechanism 104. Thus, the two connecting members 109A and 109B together form a clamp. The clamp, which includes the two connecting members 109A and 109B in this example couple the fixed member 101 to each of two fork tines of the steering mechanism 104 at locations on the steering mechanism 104 above axle fastener holes or slots in bicycle fork wheel dropouts of the steering mechanism 104 included near bottoms of the two fork tines. The rear triangle 106B or other portion of the frame of the ski bike 10 may analogously include bicycle wheel dropouts that may be used in an analogous manner as the bicycle fork wheel dropouts of the steering mechanism 104.

Two extended tabs 110A and 110B that are integral to the adapter 150 extend upward from a barrel or main body of the adapter 150. The extended tabs 110A and 110B are captured between the two connecting members 109A and 109B and are held tight using fasteners 111A, 111B and 111C (collectively "fasteners 111"). This and other configurations may prevent rotational motion of the adapter 150 and/or the fixed member 101 relative to the steering mechanism 104 and ultimately relative to the ski bike 10.

Translational motion of the adapter 150 and/or the fixed member 101 relative to the steering mechanism 104 is prevented by coupling the fixed member 101 to the steering mechanism 104 using, e.g., a bicycle axle interface and thru axle fastener 112 such as typically used to couple wheels to bicycle steering mechanisms in standard bicycles. The bicycle wheel thru axle fastener 112 is received through a hole formed in the adapter 150, e.g., in the barrel or main body of the adapter 150, and through the axle fastener holes or slots included in the steering mechanism 104, e.g., near the bottoms of the fork tines of the steering mechanism 104.

The fixed member 101 is rotatably attached to the ski bracket 102A using a fastener 113A. Between the fixed member 101 and the ski bracket 102A is the resistance damper 103A. The fixed member 101 is coupled to the ski bracket 102A with the intervening resistance damper 103A to form a joint which allows rotation of the front ski 105A relative to the steering mechanism 104 and the ski bike 10, which joint may be referred to as the front joint. Aspects of the front joint according to an example embodiment will be described with respect to FIG. 4 in additional detail.

The fixed members 101, 107 may be attached to the ski bike 10 either directly (as in the case of the fixed member 107) or indirectly (as in the case of the fixed member 101) through an adapter such as the adapter 150. Alternatively or additionally, the fixed members 101, 107 and/or the adapter 150 may be attached to the ski bike 10 through wheel dropouts of the steering mechanism 104, of the rear triangle, or of other portion of a frame of the ski bike 10. In some embodiments, the wheel dropouts may include brake bosses with threaded holes and screws may be used to couple the fixed members 101, 107 and/or the adapter 150 to the ski bike 10 through the brake bosses.

There are many options for attaching the fixed member 101 to the steering mechanism 104. In some embodiments of the ski retention system 100A, the fixed member 101 may be rigidly attached to the steering mechanism 104 by any means necessary to create the rigid attachment. Possible embodiments include the adapter 150 with clamp design as shown, an integral joint with a custom-style fork or other steering mechanism, or any other integral or joining method that holds the fixed member 101 in a similar relative position to that shown in FIG. 2A.

There are many options for the steering mechanism 104. The primary function of the steering mechanism 104 is to provide a means to steer the ski bike 10. The steering mechanism 104 illustrated in FIG. 2A and other figures is a suspension-style fork, but a rigid (e.g., non-suspension) steering mechanism or even a single straight member serving as the steering mechanism would be acceptable.

In the ski retention system 100B illustrated in FIG. 2B, the fixed member 107 is integral to and/or coupled directly to the rear triangle 106B of the ski bike 10. Since the fixed member 107 is integral to and/or coupled directly to the rear triangle 106B, its motion may be the same as the motion of the rear triangle 106. The fixed member 107 is rotatably attached to the ski bracket 102B using a fastener 113B. Between the fixed member 107 and the ski bracket 102B is the resistance damper 103B. The fixed member 107 is coupled to the ski bracket 102B with the intervening resistance damper 103B to form a joint which allows rotation of the rear ski 105B relative to the rear triangle 106B and the ski bike 10, which joint may be referred to as the rear joint.

Aspects of the rear joint according to an example embodiment will be described with respect to FIG. 4 in additional detail.

FIGS. 3A-3E respectively show a perspective view, a top view, a side view, a front view, and a back view of a lower portion of the ski retention system 100A, all arranged in accordance with at least one embodiment described herein. A lower portion of the ski retention system 100B may be configured, mutatis mutandis, similar to the lower portion of the ski retention system 100A illustrated in and described with respect to FIGS. 3A-3E.

Figure 3A:
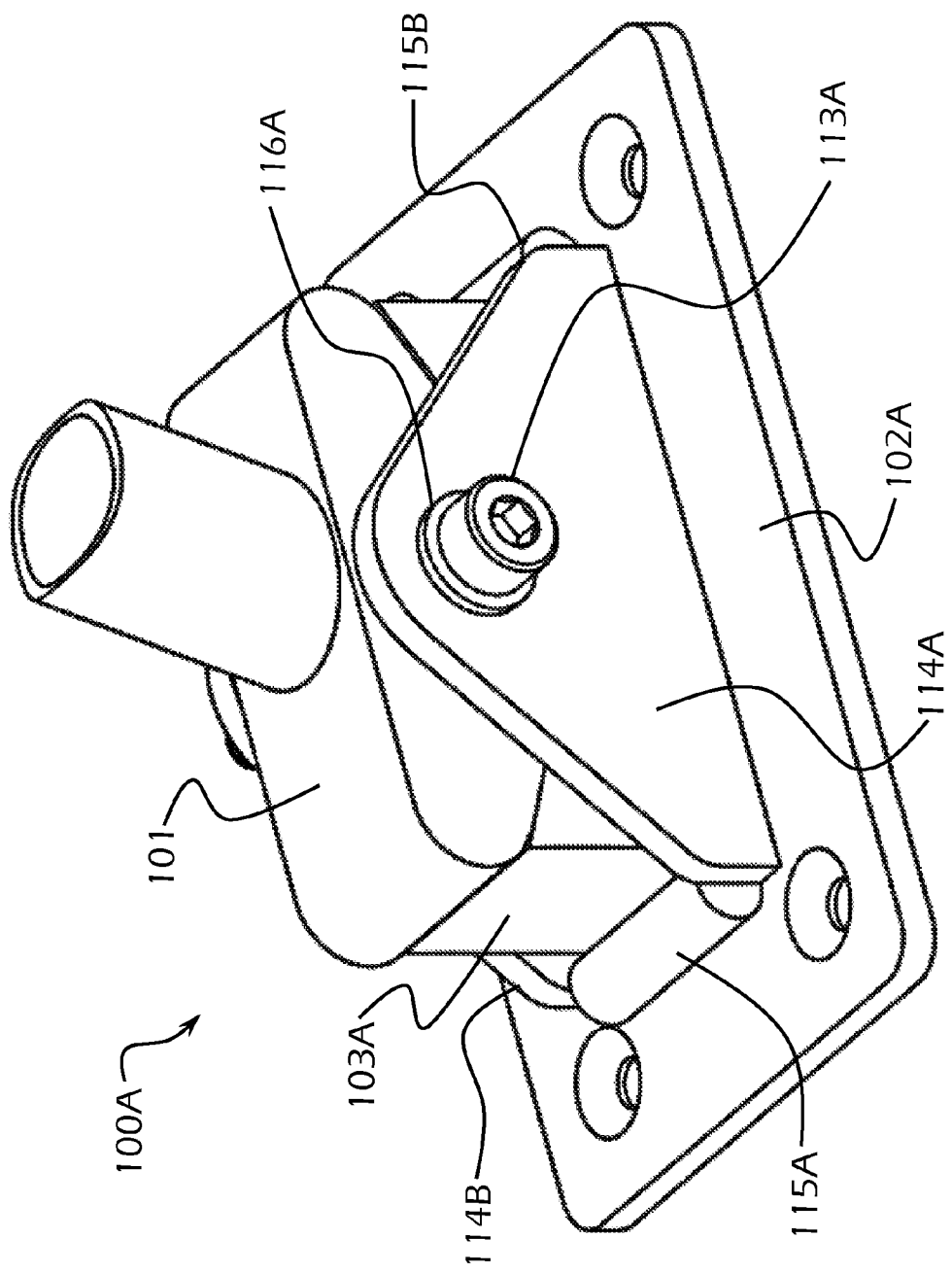

FIG. 3A shows an example embodiment of how the resistance damper 103A may be captured between the fixed member 101 and the ski bracket 102A. As illustrated, the resistance damper 103A is captured between the fixed member 101 and the ski bracket 102A in the vertical direction. In a lateral horizontal direction (e.g., a direction perpendicular to a length of the ski bracket 102A and perpendicular to a length of the front ski 105A), the resistance damper 103A is captured between two flanges 114A and 114B of the ski bracket 102A. In a longitudinal horizontal direction (e.g., a direction parallel to the length of the ski bracket 102A and parallel to the length of the front ski 105A), the resistance damper 103A is captured by two stops 115A and 115B which may be integral to the ski bracket 102A. This combination of features captures the resistance damper 103A in such a way that, when in use, it does not move appreciably in any direction relative to the ski bracket 102A and therefore resists rotation of the ski bracket 102A (and the front ski 105A) relative to the fixed member 101.

FIGS. 3A-3E additionally illustrate portions of various fasteners to attach the fixed member 101 to the ski bracket 102A. The illustrated fasteners include a screw or bolt 113A, washers 116A and 116B, and a nut 117. All fasteners may be of various forms. For instance, screw 113A could have any type of head. Washers 116A and 116B could be flat or various locking styles or not used at all. Nut 117 could be any type of nut from a simple hex nut to various locking style nuts. More generally, each of one or more fasteners used to attach the fixed member 101 to the ski bracket 102A may include a screw, a nut, a bolt, a washer, a clevis pin, a cotter pin, or other suitable fastener.

Figure 3B:
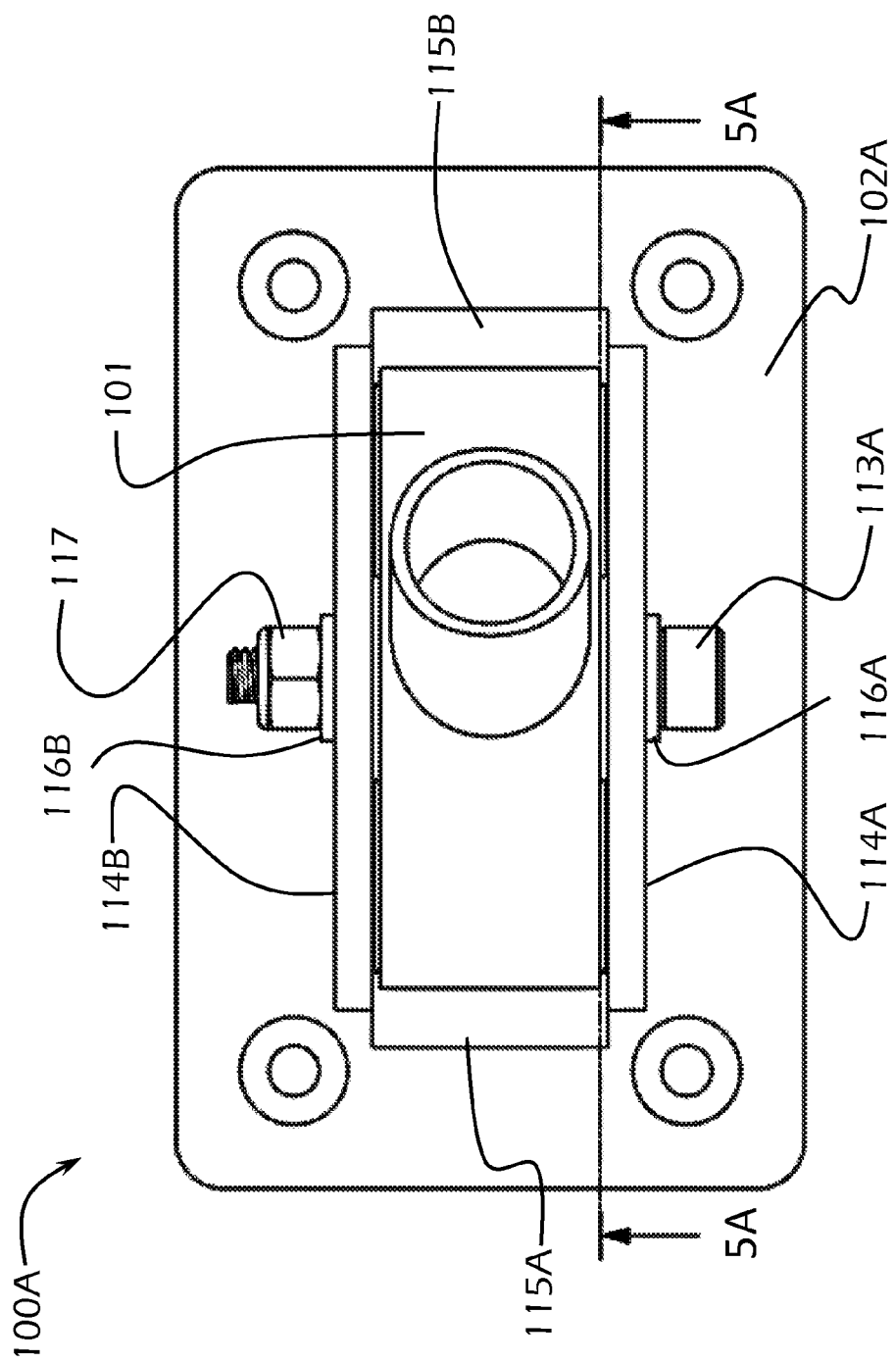
Figure 3D:
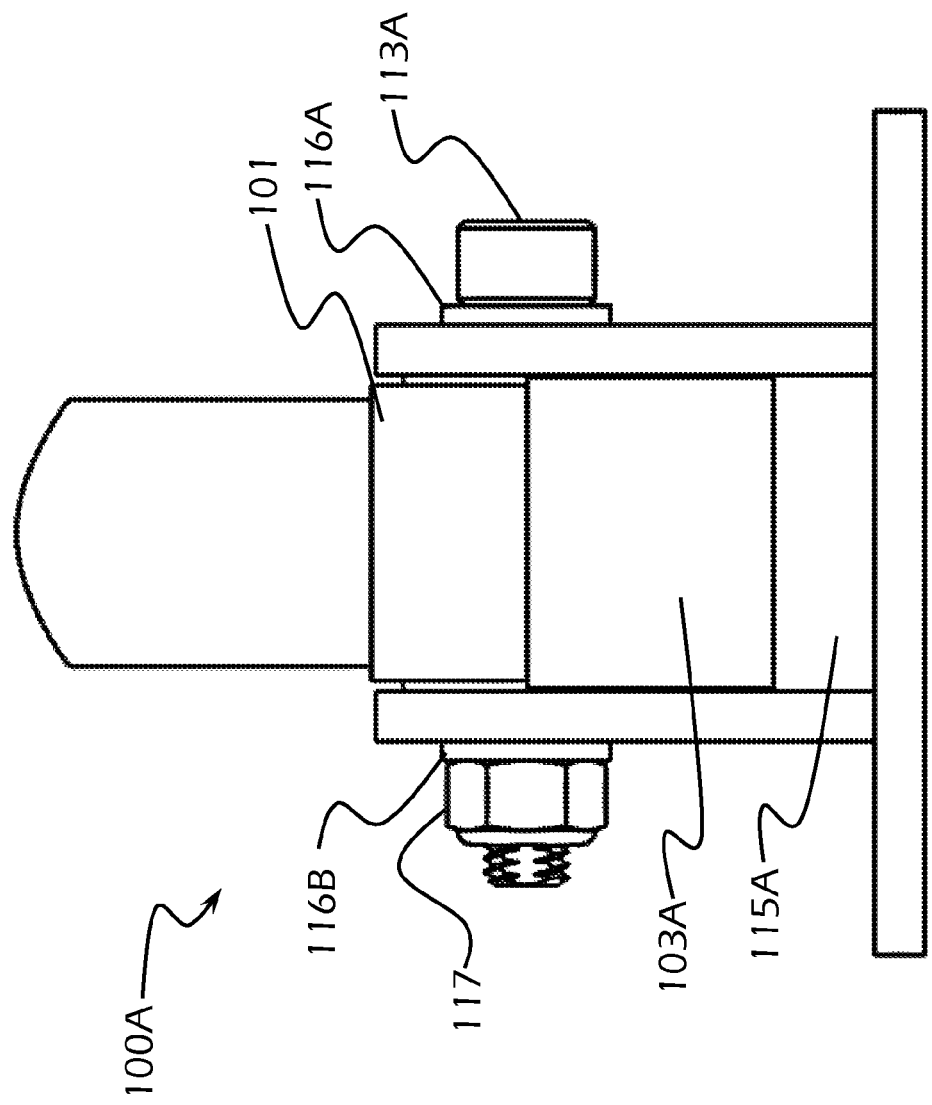
Figure 4:
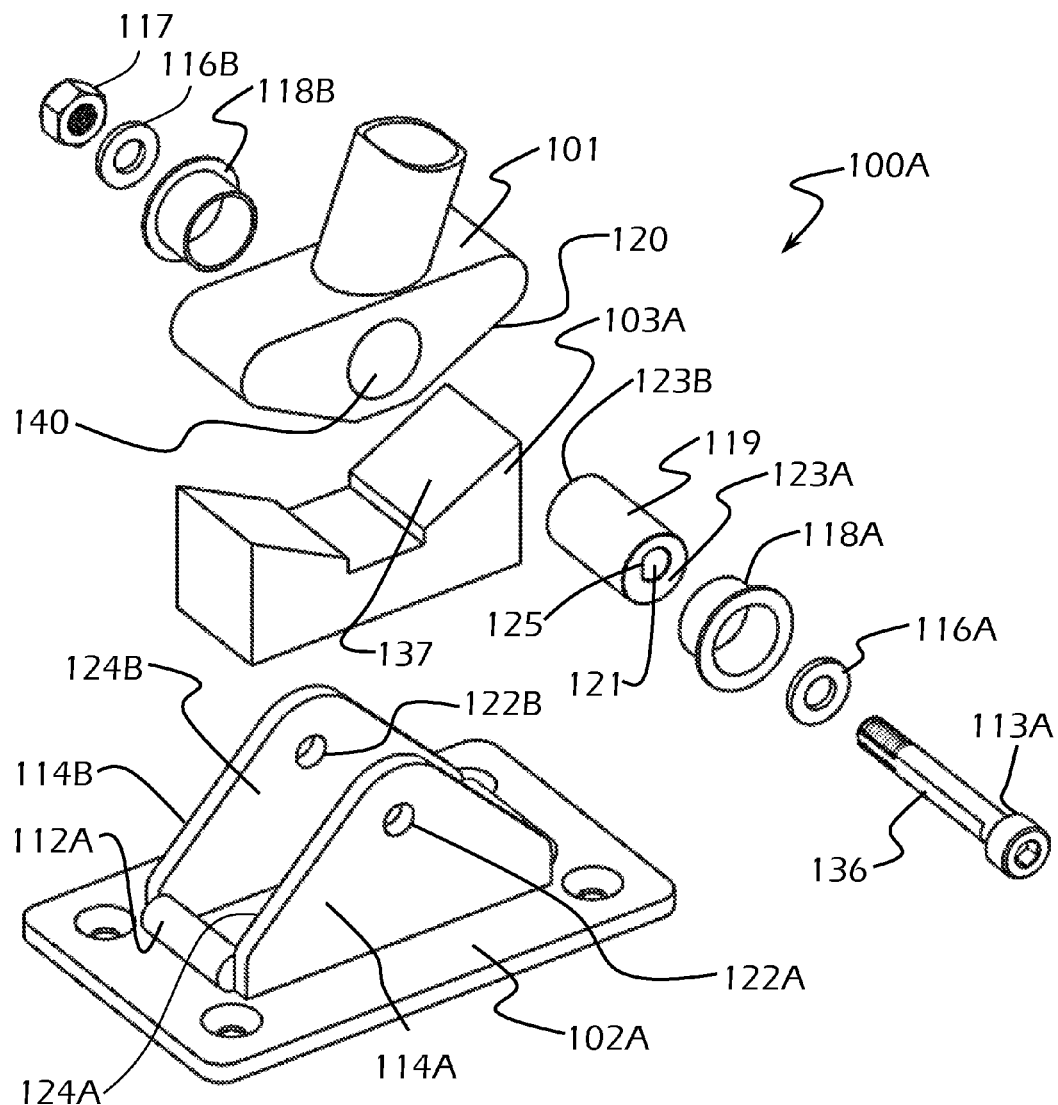
FIG. 4 shows an exploded perspective view of the ski retention system of FIGS. 3A-3E.

FIG. 4 shows an exploded perspective view of the lower portion of the ski retention system 100A illustrated in FIGS. 3A-3E, arranged in accordance with at least one embodiment described herein. The lower portion of the ski retention system 100B may be configured, mutatis mutandis, similar to the lower portion of the ski retention system 100A illustrated in and described with respect to FIG. 4. FIG. 4 illustrates the ski bracket 102A, the resistance damper 103A, a portion of the fixed member 101, the screw 113A, the washers 116 A and 116B, and the nut 117. FIG. 4 additionally illustrates bushings 118A and 118B and a spacer 119. Each of the foregoing components will be described in turn.

The ski bracket 102A, the fixed member 101, the resistance damper 103A, and optionally the adapter 150, may form the primary components of the ski retention system 100A and may provide the means to allow the front ski 105A to rotate and move over undulations in the snow while providing resistance for riding and turning the ski bike 10. A shape of a lower member 120 of the fixed member 101 may be virtually any shape. In addition, a top surface 137 of the resistance damper 103A may be virtually any shape but in general may be complementary in shape to the lower member 120 of the fixed member 101. For instance, as illustrated, the lower member 120 of the fixed member 101 has a somewhat trapezoidal cross-sectional shape while the top surface 137 of the resistance damper 103A has a somewhat flat-bottomed v-channel cross-sectional shape. Rotational resistance provided by the resistance damper 103A may be infinitely tunable by, e.g., varying the interface between the lower member 120 of the fixed member 101 and the surface 137 of the resistance damper 103A. Variations may include any shape of the lower member 120, any shape of the surface 137 of the resistance damper 103A, and a hardness of the resistance damper 103A. Hardness could vary from very soft to rigid. Alternatively or additionally, different hardnesses may be suitable for different snow conditions or rider sizes. For instance, a relatively soft resistance damper 103A may be more suitable for a lighter rider while a relatively hard resistance damper 103A may be more suitable for a heavier rider.

Furthermore, the resistance damper 103A may include a single homogeneous material with, e.g., a single consistent hardness throughout or may include multiple hardnesses. Example embodiments and methods using multiple hardnesses may include using inserts, bonding multiple materials, or molding multiple materials. Multiple hardness embodiments are not limited to these examples.

In the illustrated embodiment, the fixed member 101 may be fastened to the ski bracket 102A using the bushings or bearings 118A and 118B, the spacer 119 and the fasteners 113A, 116A, 116B and 117 (hereinafter the "fastener assembly"). The spacer 119 may be configured to maintain a distance between the two flanges 114A and 114B of the ski bracket 102A as the fastener assembly is tightened. The spacer 119 has outward facing surfaces 123A and 123B that bear against inward facing flange surfaces 124A and 124B of the flanges 114A and 114B to maintain the spacing between the two flanges 114A and 114B.

In some embodiments, it may improve performance of the ski retention system 100A if the resistance damper 103A is in full contact with the fixed member 101 and the ski bracket 102A. Full contact, which might also be described as preload, may be difficult to achieve without a mechanical advantage since the parts when in full contact are in intimate contact with the resistance damper 103A slightly compressed. To facilitate ease of assembly of the fixed member 101 to the ski bracket 102A with the resistance damper 103A therebetween, a cam-style mechanical advantage device may be implemented in the ski retention system 100A, as illustrated in FIG. 4. Any other mechanical advantage may be implemented to achieve the noted contact and/or preload. The cam-style mechanical advantage device is just one of many possible embodiments. Other mechanical advantage devices that may be implemented herein may include using cam nuts with offset hole, previously discussed, or similar cam devices with levers. The cam-style mechanical advantage device illustrated in FIG. 4 may operate as follows. The bushings or bearings 118A and 118B are assembled into a hole 140 defined in the lower member 120 of the fixed member 101. The hole 140 may pass completely through the lower member 120. The spacer 119 is placed axially within the bushings or bearings 118A and 118B within the hole 140 of the fixed member 101. The resistance damper 103A is placed into the ski bracket 102A as previously discussed. The spacer 119 includes an offset D-shaped hole 121 that passes through the spacer 119 from one surface 123A to the other surface 123B. With the bushings or bearings 118A and 118B and the spacer 119 assembled into the hole 140 of the fixed member 101, the foregoing components can then be placed on top of the resistance damper 103A with the D-shaped offset hole coaxial with holes 122A and 122B defined in the ski bracket 102A. The screw 113A includes a flat surface 136 with its overall profile similar or complementary to the D-shaped offset hole 121 in the spacer 119. With the spacer 119 and the D-shaped offset hole 121 in the "loose" position (to be later described in FIGS. 5A and 5B), the screw 113A may be inserted through the washer 116A, the hole 122A of the ski bracket 102A, the spacer 119 (noting that a flat 125 of the D-shaped offset hole 121 and the flat 136 of the screw 113A must be aligned), the hole 122B of the ski bracket 102A, and the washer 116B. The nut 117 may also be installed loosely on the end of the screw 113A. By rotating the screw 113A, the flat 136 of the screw 113A bears against the flat 125 in the D-shaped offset hole 121, and by a cam action the fixed member 101 is tightened against the resistance damper 103A and is rotatably attached to the ski bracket 102A.

FIG. 5A shows a cross-sectional view of the ski retention system 100A of FIG. 3B in the "tight" position, arranged in accordance with at least one embodiment described herein. In the "tight" position, a centerline $c_1$ of the offset D-shaped hole 121 is above a centerline $c_2$ of the spacer 119. Since the holes 122A and 122B in the ski bracket 102A are fixed, the effect of the offset D-shaped hole 121 in this "tight" position is to tighten or preload the fixed member 101 against the resistance damper 103A, as denoted in FIG. 5A at 138.

Figure 5B:
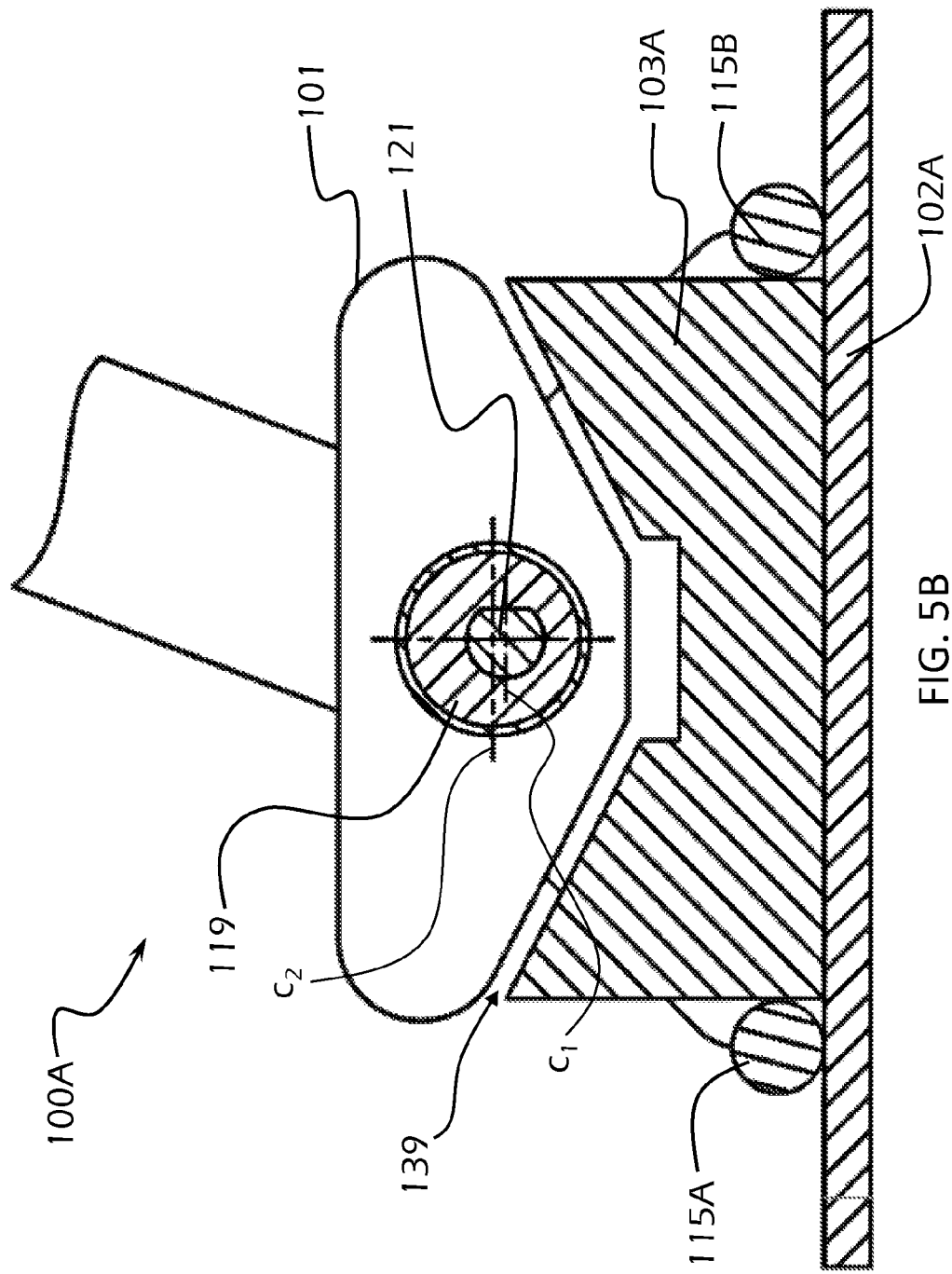
FIG. 5B shows a cross-sectional view of the ski retention system of FIG. 5A arranged in a "loose" or "open" position.

FIG. 5B shows a cross-sectional view of the ski retention system 100A in the "loose" position, arranged in accordance with at least one embodiment described herein. In the "loose" position, the centerline $c_1$ of the offset D-shaped hole 121 is below the centerline $c_2$ of the spacer 119. Since the holes 122A and 122B in the ski bracket 102A are fixed, the effect of the offset D-shaped hole 121 in this "loose" position is to loosen the fixed member 101 from the resistance damper 103A, as indicated by a gap denoted at 139 between the fixed member 101 and the resistance damper 103A.

Figure 6:
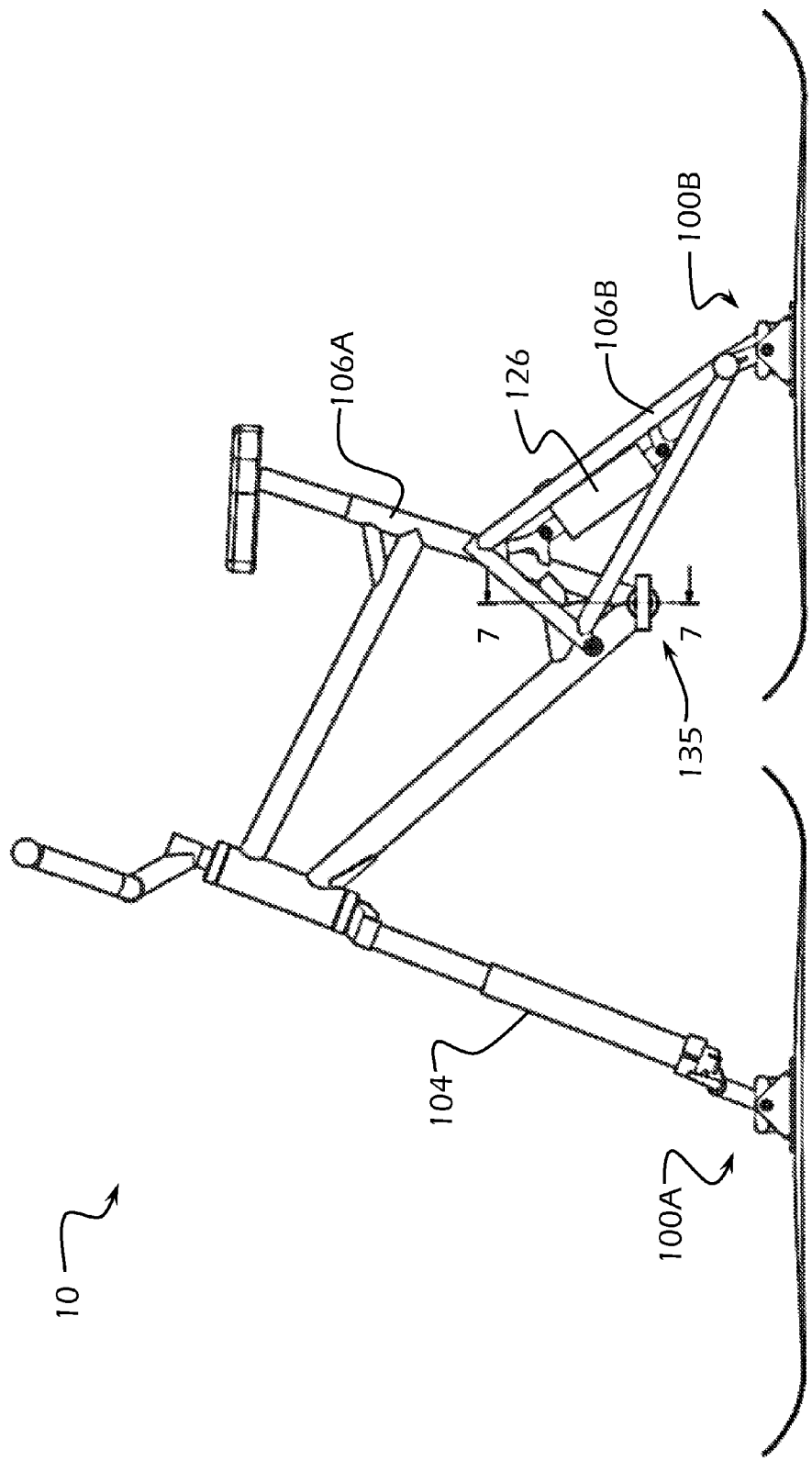
FIG. 6 shows a side view of an example embodiment of the ski bike of FIG. 1 with a rear shock tucked within a rear triangle of the ski bike to form a protected suspension system.

FIG. 6 shows a side view of an example embodiment of the ski bike 10 of FIG. 1, arranged in accordance with at least one embodiment described herein. This example embodiment is a full suspension ski bike based on the suspension provided by the steering mechanism 104 and a rear shock 126. Some embodiments described herein protect the rear shock 126 from impact. Protecting the rear shock 126 from impact may preserve its functionality. When hauled on chair lifts, the rear of the ski bike 10 may be subject to impacts from the chair lifts, e.g., when the ski bike 10 is loaded on chair lifts. The configuration of the ski bike 10 illustrated in FIG. 6 may protect the rear shock 126 from such impacts as the rear shock 126 is generally surrounded by the rear triangle 106B or a swing arm. While objects narrower than open gaps of the rear triangle 106B might in some cases enter the rear triangle 106B and come in contact with the rear shock 126, the rear triangle 106B will interfere with and prevent relatively broad objects like chair lift seats, with dimensions larger than the open gaps of the rear triangle 106B, from penetrating inside the rear triangle 106B and coming in contact with the rear shock 126.

Figure 7:
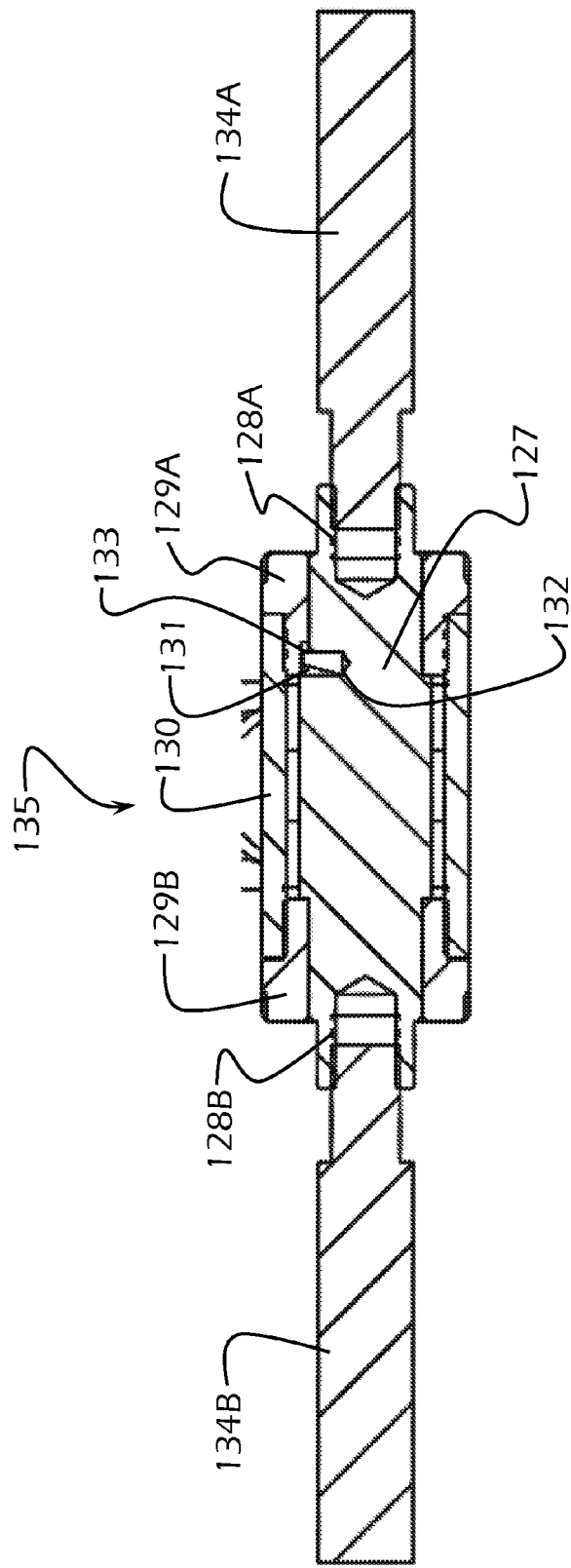
FIG. 7 shows a cross-sectional view of a foot peg or pedal assembly that may be included in the ski bike of FIG. 6.
Figure 8:
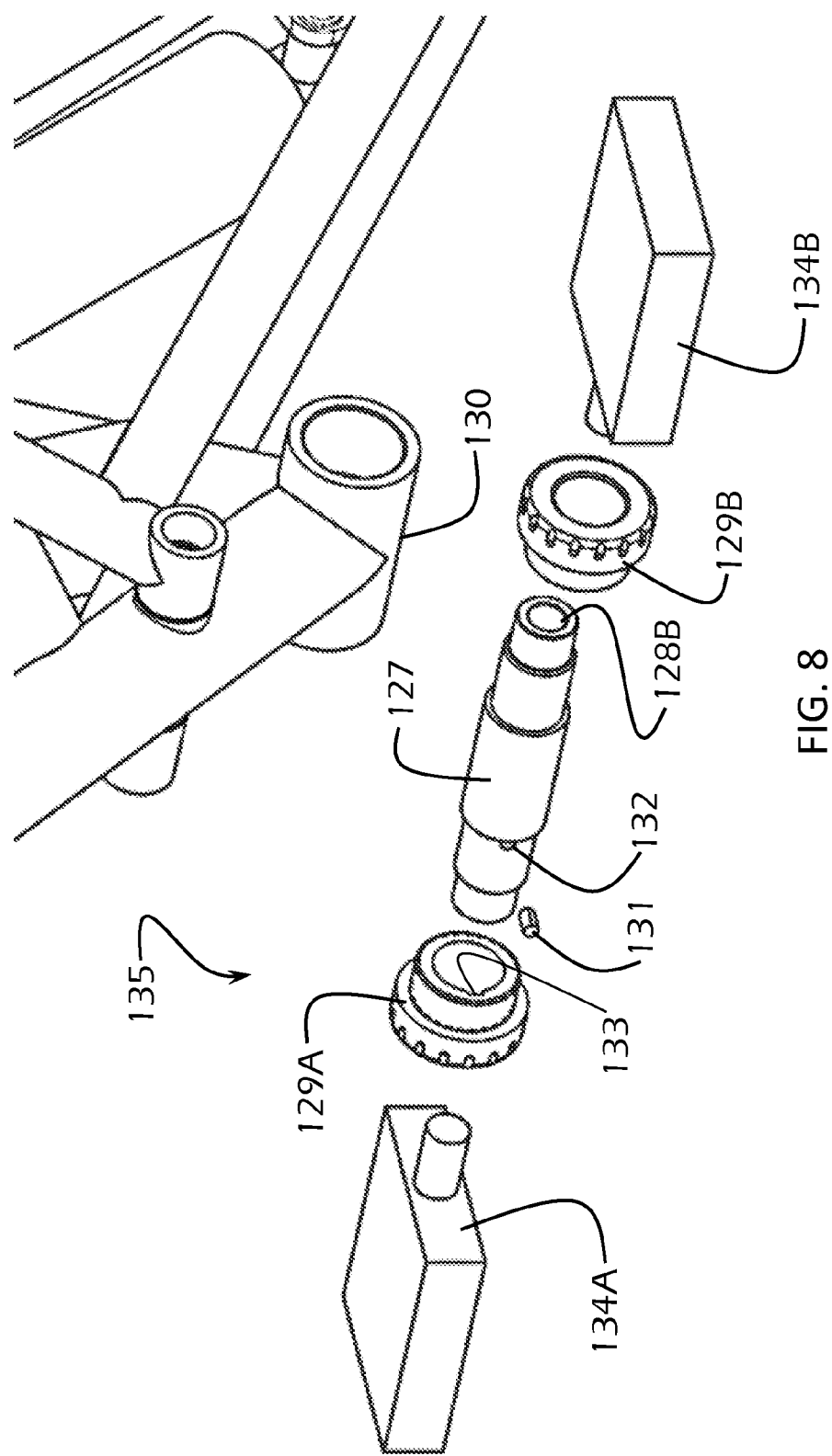
FIG. 8 shows an exploded perspective view of the foot peg or pedal assembly of FIG. 7, all arranged in accordance with at least one embodiment described herein.

FIG. 6 additionally illustrates a foot peg or pedal assembly 135 (hereinafter "assembly 135"). FIG. 7 shows a cross-sectional view of the assembly 135 of FIG. 6 at the cutting plane 7-7 in FIG. 6, arranged in accordance with at least one embodiment described herein. FIG. 8 shows an exploded perspective view of the assembly 135 FIGS. 6 and 7, arranged in accordance with at least one embodiment described herein.

With combined reference to FIGS. 7 and 8, the assembly 135 may include a pedal tube 127, which may be replaceable in some embodiments. The ability to have the pedal tube 127 be replaceable may be useful in a ski bike since it may allow for replacement due to damage or normal wear. In addition, the pedal tube 127 can be configured with standard pedal threads 128A and 128B such that an end user can configure the end user's ski bike with any pedals or platforms 134A and 134B the end user chooses. Alternatively or additionally, the end user may configure their standard wheeled bicycle frame as a ski bike by installing the assembly 135 in the bicycle's bottom bracket as described below as well as connecting the bicycle's steering mechanism and rear triangle to front and rear skis (as opposed to wheels), e.g., through the ski retention systems 100A, 100B.

With continued reference to FIGS. 7 and 8, the pedal tube 127 may be attached to the ski bike 10 as follows. A right cup 129A is configured with a left-hand thread, as is a right side of a bottom bracket 130 of the ski bike 10. The right cup 129A is threaded into the right side of the bottom bracket 130 and tightened. A pin 131 is placed in a blind hole 132 of the pedal tube 127. The pedal tube 127 is placed through the bottom bracket 130 from the left side, and the pin 131 is aligned with a slot 133 in the right cup 129A. A left cup 129B, which may be configured with a right-hand thread, is then threaded into a left side of the bottom bracket 130 of the ski bike 10, where the left side of the bottom bracket 130 also is configured with a right-hand thread. As the pedals or platforms 134A and 134B are threaded into the pedal tube 127, torque is reacted through the pin 131, the slot 133 and into the right cup 129A, which is already tight. The pin 131 and slot 133 combination may be on either the right or left side depending on whether pedal 134A or 134B torque is to be reacted for a tightening or loosening operation. This configuration may allow the assembly 135 to be fully replaceable while meeting requirements of strength and rigidity.

Various alternative arrangements for the assembly 135 will be apparent in view of the instant disclosure instead of or in addition to the mirrored alternative already mentioned. For instance, the pin 131 may be placed in a blind hole inside the right cup 129A or the left cup 129B to be aligned with and received into a slot that extends axially on an exterior of the pedal tube 127.

Moreover, the pin 131 is an example of a discrete component separable from the pedal tube 127 and/or the right and left cups 129A, 129B that can be used to prevent rotation of the pedal tube 127 relative to one or both of the right cup 129A or the left cup 129B. More generally, a protrusion that extends, e.g., outward from the pedal tube 127 or inward from the right or left cup 129A, 129B, may be aligned with and received into a slot formed on, e.g., an interior of the right or left cup 129A, 129B or an exterior of the pedal tube 127, respectively. Such a protrusion may be separable from the other components as in the case of the pin 131, or integrally formed with one of the other components.

The present disclosure is not to be limited in terms of the particular embodiments described herein, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of this disclosure. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that include A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

For any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, and/or others. As a non-limiting example, each range discussed herein can be readily broken down into a lower third, middle third and upper third, etc. All language such as "up to," "at least," and the like include the number recited and refer to ranges which can be subsequently broken down into sub ranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, various embodiments of the present disclosure have been described herein for purposes of illustration, and various modifications may be made without departing from the scope and spirit of the present disclosure. Accordingly, the various embodiments disclosed herein are not intended to be limiting.

What is claimed is:

1. A ski bike comprising:
   a frame;
   a steering mechanism rotatably coupled to the frame;
   a ski; and
   a ski retention system that rotatably couples the ski to the frame or the steering mechanism, wherein the ski retention system includes:
   a ski bracket rigidly coupled to the ski;
   a fixed member rigidly coupled to the frame or the steering mechanism and rotatably coupled to the ski bracket;
   a resistance damper disposed between the ski bracket and the fixed member; and
   a mechanism to preload the resistance damper between the ski bracket and the fixed member.

2. The ski bike of claim 1, wherein the resistance damper prevents free rotation of the ski bracket relative to the fixed member.

3. The ski bike of claim 1, wherein the resistance damper prevents excessive rotation of the ski bracket relative to the fixed member.

4. The ski bike of claim 1, wherein the mechanism includes:
   a spacer disposed in a hole formed in the fixed member, wherein the spacer includes an offset D-shaped through hole and the spacer acts as a cam when rotated; and
   a D-shaped screw disposed within the offset D-shaped through hole of the spacer.

5. The ski bike of claim 4, wherein:
   rotation of the D-shaped screw is effective to control a location of a centerline of the offset D-shaped through hole relative to a centerline of the spacer;
   in response to positioning the centerline of the offset D-shaped through hole above the centerline of the spacer, the resistance damper is preloaded between the fixed member and the ski bracket; and
   in response to positioning the centerline of the offset D-shaped through hole below the centerline of the spacer, the resistance damper is separated from the fixed member by a gap such that the D-shaped screw can be easily removed from or inserted through the offset D-shaped through hole.

6. The ski bike of claim 1, wherein the ski retention system further includes a rotation limiting mechanism, whereby the rotation limiting mechanism prevents excessive rotation of the ski bracket relative to the fixed member.

7. The ski bike of claim 1, wherein an axis of rotation of the ski bracket relative to the fixed member is in a range of zero inches to four inches above a bottom surface of the ski.

8. The ski bike of claim 1, wherein the ski bike further includes an adapter that rigidly couples the frame or the steering mechanism to the fixed member.

9. The ski bike of claim 8, wherein:
the adapter rigidly couples the frame to the fixed member at bicycle wheel dropouts of the frame; or
the steering mechanism comprises a fork with bicycle fork wheel dropouts and the adapter rigidly couples the fork with bicycle fork wheel dropouts to the fixed member.

10. The ski bike of claim 9, further comprising a bicycle wheel thru axle fastener received through a hole formed in the adapter and through axle fastener holes or slots included in the bicycle wheel dropouts of the frame or the bicycle fork wheel dropouts of the fork, the bicycle wheel thru axle fastener coupling the adapter to the frame or the fork to prevent, when fastened, the adapter and the fixed member from translating relative to the bicycle wheel dropouts of the frame or the bicycle fork wheel dropouts of the fork.

11. The ski bike of claim 10, wherein the bicycle fork wheel dropouts of the fork are formed near bottoms of two tines of the fork, wherein the adapter includes a clamp that couples the adapter to the two tines of the fork at locations on the tines above the axle fastener holes included in the bicycle fork wheel dropouts near the bottoms of the two tines, the clamp preventing the adapter and the fixed member from rotating relative to the bicycle fork wheel dropouts.

12. The ski bike of claim 11, wherein the fixed member includes at least one extended tab that extends out from the fixed member and that is captured in the clamp.

13. The ski bike of claim 9, wherein the bicycle wheel dropouts of the frame or the bicycle fork wheel dropouts of the fork include bicycle brake bosses with threaded holes, further comprising screws that couple the adapter to the bicycle brake bosses, the screws and the bicycle brake bosses preventing the adapter and the fixed member from rotating relative to the fork.

14. The ski bike of claim 1, wherein the frame includes a front triangle and a separate rear triangle or swing arm rotatably coupled to the front triangle, the ski bike further comprising a rear shock having a first end coupled to the front triangle and a second end coupled to the rear triangle or the swing arm, wherein the rear shock is disposed within an envelope defined by the rear triangle or the swing arm.

15. The ski bike of claim 1, further comprising:
a bottom bracket interface formed in the frame; and
a foot peg or pedal assembly coupled to the bottom bracket interface, wherein the foot peg or pedal assembly includes:
a first cup coupled to a first side of the bottom bracket interface;
a second cup coupled to a second side of the bottom bracket interface opposite the first side; and
a pedal tube disposed in the bottom bracket interface with a first end that extends out through the first cup, a second end that extends out through the second cup, wherein one of:
the first cup includes a slot that receives a protrusion that extends outward from the pedal tube; or
the pedal tube includes a slot that receives a protrusion that extends inward from the first cup; and
wherein the protrusion received in the slot is configured to fix the pedal tube with respect to the bottom bracket interface to prevent rotation of the pedal tube relative to the bottom bracket interface during installation and removal of pegs or pedals in the first and second ends of the pedal tube.

16. A ski bike, comprising:
a front triangle;
a steering mechanism rotatably coupled to the front triangle;
a rear triangle or a swing arm rotatably coupled to the front triangle;
a ski coupled at the rear triangle or the swing arm;
a rear shock having a first end coupled to the front triangle and a second end coupled to the rear triangle or the swing arm, wherein the rear shock is disposed within an envelope defined by the rear triangle or the swing arm;
a bottom bracket interface formed in the front triangle; and
a foot peg or pedal assembly coupled to the bottom bracket interface, wherein the foot peg or pedal assembly includes:
a first cup coupled to a first side of the bottom bracket interface;
a second cup coupled to a second side of the bottom bracket interface opposite the first side; and
a pedal tube disposed in the bottom bracket interface with a first end that extends out through the first cup, a second end that extends out through the second cup, wherein one of:
the first cup includes a slot that receives a protrusion that extends outward from the pedal tube; or
the pedal tube includes a slot that receives a protrusion that extends inward from the first cup; and
wherein the protrusion received in the slot is configured to fix the pedal tube with respect to the bottom bracket interface to prevent rotation of the pedal tube relative to the bottom bracket interface during installation and removal of pegs or pedals in the first and second ends of the pedal tube.

17. A ski bike comprising:
a frame;
a steering mechanism rotatably coupled to the frame;
a ski;
a ski retention system that rotatably couples the ski to the frame or the steering mechanism, wherein the ski retention system includes:
a ski bracket rigidly coupled to the ski; and
a fixed member rigidly coupled to the frame or the steering mechanism and rotatably coupled to the ski bracket;
an adapter that rigidly couples the frame or the steering mechanism to the fixed member, wherein:
the adapter rigidly couples the frame to the fixed member at bicycle wheel dropouts of the frame; or
the steering mechanism comprises a fork with bicycle fork wheel dropouts and the adapter rigidly couples the fork with bicycle fork wheel dropouts to the fixed member; and
a bicycle wheel thru axle fastener received through a hole formed in the adapter and through axle fastener holes or slots included in the bicycle wheel dropouts of the frame or the bicycle fork wheel dropouts of the fork, the bicycle wheel thru axle fastener coupling the adapter to the frame or the fork to prevent, when fastened, the adapter and the fixed member from translating relative to the bicycle wheel dropouts of the frame or the bicycle fork wheel dropouts of the fork.

18. The ski bike of claim 17, wherein the bicycle fork wheel dropouts of the fork are formed near bottoms of two tines of the fork, wherein the adapter includes a clamp that couples the adapter to the two tines of the fork at locations on the tines above the axle fastener holes included in the bicycle fork wheel dropouts near the bottoms of the two tines, the clamp preventing the adapter and the fixed member from rotating relative to the bicycle fork wheel dropouts.

19. The ski bike of claim 18, wherein the fixed member includes at least one extended tab that extends out from the fixed member and that is captured in the clamp.

\* \* \* \* \*